United States Patent [19]

Rapps

[11] 4,335,863
[45] Jun. 22, 1982

[54] HOLDING DEVICE FOR ATTACHMENT TO ELECTRICAL INSTALLATIONS

[76] Inventor: John W. Rapps, 1683 Westervelt Ave., Baldwin, N.Y. 11510

[21] Appl. No.: 134,882

[22] Filed: Mar. 28, 1980

[51] Int. Cl.³ ............................ A47F 5/00; H05K 5/03
[52] U.S. Cl. .................................. 248/316 D; 24/3 J; 24/3 L; 24/11 R; 40/10 R; 40/11 R; 174/66; 220/241; 339/123; D8/351
[58] Field of Search ............. 248/316 D; 24/3 J, 3 L, 24/11 R, 67.5; 40/10 R, 11 R; 174/66, 67; 220/241, 242; 339/123; D8/351

[56] References Cited

U.S. PATENT DOCUMENTS

| | | | |
|---|---|---|---|
| 384,684 | 6/1888 | Fenn | 40/11 R |
| 1,889,742 | 12/1932 | Barclay | 248/316 D |
| 2,392,445 | 1/1946 | Anderson | 174/66 X |
| 2,939,234 | 6/1960 | Hill | 40/11R |
| 3,809,799 | 5/1974 | Taylor | 248/316 D |

OTHER PUBLICATIONS

The Washington Post Parade, Aug. 23, 1959, p. 21.

*Primary Examiner*—James Kee Chi
*Attorney, Agent, or Firm*—Herbert L. Lerner; Laurence A. Greenberg

[57] ABSTRACT

Holding device for attachment to electrical installations, including a base portion, a device for attaching the base portion to the electrical installation, and a flange portion integral with and extending outwardly from the base portion for holding articles between the flange and a wall in which the electrical installation is installed.

14 Claims, 5 Drawing Figures

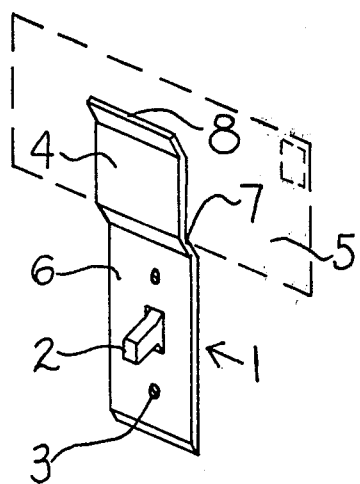
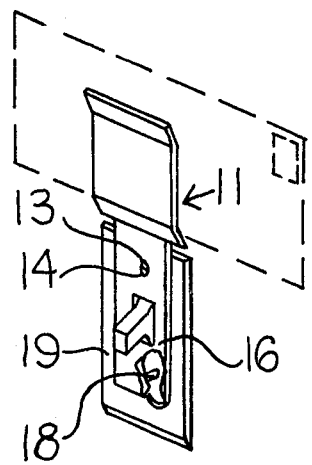
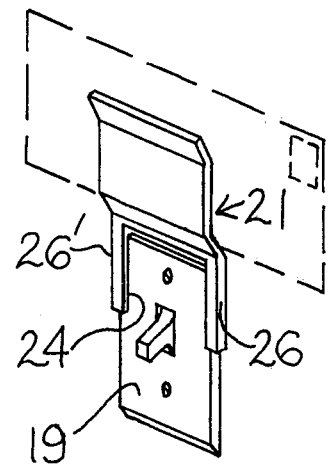
FIG. 1    FIG. 2    FIG. 3
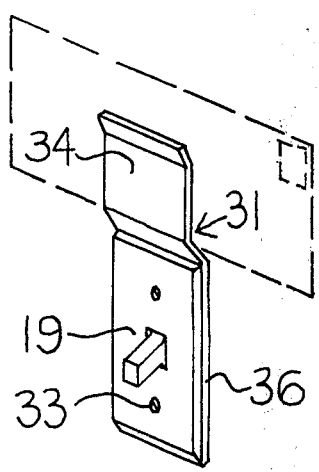
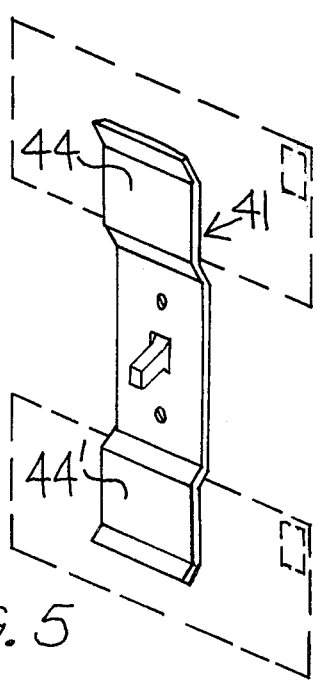
FIG. 4    FIG. 5

HOLDING DEVICE FOR ATTACHMENT TO ELECTRICAL INSTALLATIONS

The invention relates to a holding device for collecting or storing letters, memos, mail, documents or other papers on a wall in vicinity of an electrical outlet, receptacle or other such installation. Very often, in a residential or commercial building, or boats, vessels and mobile units, it is desirous to keep such papers near an electrical plate because it is near the entrance to a room, for example. Therefore, the device is constructed for attachment to, or replacement of, existing electrical plates.

Devices of this general type which allow storage of articles near an electrical plate have been known in the past. For example, U.S. Pat. Nos. 2,943,138, 3,113,996 and 3,331,915 each disclose devices having hooks for holding articles or electrical cords. However, if an article such as an envelope is not shaped in a way that allows it to be hung on a hook, then it cannot be stored with such devices.

Design Patent D-118,175 discloses a decorative wall plate with an extension running parallel to a wall, but this extension merely leaves a space between it and the wall and it is not sturdily enough constructed to reliably hold any article of substance or to exert any pressure thereon, nor is this the object of the device.

It is accordingly an object of the invention to provide a holding device for attachment to electrical installations which overcomes the hereinafore-mentioned disadvantages of the heretofore-known devices of this general type, and to provide a device which can replace or be used with an existing plate and will reliably hold one or more articles of varying dimensions to a wall.

With the foregoing and other objects in view there is provided, in accordance with the invention, a holding device for attachment to electrical installations, comprising a base portion, means for attaching the base portion to the electrical installation, and a flange portion integral with and extending outwardly from the base portion for holding articles between the flange and a surface of a wall in which the electrical installation is installed. The flange portion can be dimensioned in any shape necessary to hold particular kinds of papers. Naturally, any decorative finish or cutout could be formed on the device. A disclosure document generally showing an embodiment of the instant application was filed on Dec. 10, 1979, and given No. 086,491.

In accordance with another feature of the invention, the base portion and the flange are formed of a one-piece unit. The holding device can be made of any material that is normally used for electrical plates, such as plastic, paper, wood, metal, ceramic or glass. Furthermore, the base and flange can be separate pieces which are fastened together.

In accordance with a further feature of the invention, the base and flange portions together form a T-shaped unit with the base portion being narrower than the flange portion. This device is contemplated for use with an existing electrical plate, by screwing, pinning or gluing the two parts together.

In accordance with an added feature of the invention, the base portion is in the form of two brackets each having an inner edge facing each other, the inner edges being mutually spaced apart by a distance equal to an outside dimension of a conventional electrical plate, and being slideable thereover, the attaching means being the inner edges of the brackets. This embodiment provides a particularly sturdy unit which is easy to install and remove. Furthermore, in order to provide even greater solidity, in accordance with an additional feature of the invention, the inner edges of the brackets have grooves formed along the length thereof, the outer edges of the plate being partially insertable in the grooves.

In accordance with yet another feature of the invention, the base portion is insertable between a conventional electrical plate and the electrical installation. This embodiment sandwiches the device between the electrical installation and an existing plate. Holes or slots which cover the area where a screw is normally inserted, are formed in the base portion. Additionally in accordance with yet a further feature of the invention, there is provided a doubly-bent portion between the base and the flange portions corresponding in depth substantially to the thickness of a conventional electrical plate.

In accordance with yet an added feature of the invention, there is provided at least one additional flange portion integral with and extending outwardly from the base portion in a different direction than the first-mentioned flange portion. This greatly increases the holding area of the device.

In accordance with yet an additional feature of the invention, the base portion has a length and width substantially equal to a conventional electrical plate. In this way, the appearance of an electrical plate is simulated when the existing plate is removed, and the base portion is hidden when it is disposed behind the plate.

In accordance with still another feature of the invention, the attaching means is glue or the attaching means is an adhesive strip. These holding devices are particularly easily attached to a plate.

In accordance with still a further feature of the invention, the attaching means includes holes formed in the base portion in alignment with threaded holes formed in a conventional electrical plate.

In accordance with a concomitant feature of the invention, the flange portion is prestressed against the surface of the wall and it may be provided that the flange portion is bent toward the surface of the wall.

Other features which are considered as characteristic for the invention are set forth in the appended claims.

Although the invention is illustrated and described herein as embodied in a holding device for attachment to electrical installations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic perspective view of a first embodiment of the holding device for attachment to electrical installations of the invention, in the form of a one-piece unit with a switch plate;

FIG. 2 is a view similar to FIG. 1, showing a second embodiment of the invention which is an overlay type holder;

FIG. 3 shows the slip on type holder of the third embodiment;

FIG. 4 shows an underlayment type holder of the fourth embodiment; and

FIG. 5 shows a double type holder which is somewhat similar to FIG. 4, in a fifth embodiment of the invention.

Referring now to the figures of the drawing and first particularly to FIG. 1 thereof, there is seen a combined switch plate holding device 1 of the invention. The holding device 1 includes an upwardly extending flange portion 4 which is holding an envelope 5. The flange portion 4 can be a one-piece unit with the base 6 or it can be a separate piece attached thereto. The base portion 6 of the holding device 1 is in the shape of a conventional switch plate which has openings formed therein through which the actuator 2 of a switch and screws 3 that fasten the holder 1 to the switch, protrude. The openings are in the same location at which any conventional switch plate would have openings. It is understood that the base portion of the holder 1 can have any cutouts for a conventional electrical installation formed therein, such as for an electrical outlet, or for a plurality of such outlets or switches or a combination thereof. Naturally, the base portion 6 can be made wider or larger to accomodate different electrical installations and the flange 4 can either remain at the width shown in FIG. 1, be matched to the width of the base portion 6, or be any width therebetween.

The holding device 1 itself may be a stamped-out sheet metal part or molded plastic having a certain resiliency. The natural resiliency of the material enables the flange 4 to hold papers, such as the envelope 5 to a wall. However, extra resiliency and holding force may be supplied by pre-stressing the flange 4 with a curved or creased flange portion 7 that biasis the edge 8 of the flange 4 against the wall when the screws 3 are installed.

FIG. 2 shows an overlay T-shaped holding device 11. The holding device 11 is superimposed on a conventional switch plate 19. The screws 13 pass through holes in the base portion 16 of the T-shaped holder 11, which are co-axial with the holes in the plate 19. The screws 13 may be larger for this purpose or recesses may be formed in the lower part so that standard screws can be used. Larger holes 14 may alternatively be cut into the lower part 16 so that the screws 13 do not grip the holding device 11 at all. In that case, the holding device 11 is fastened to the switch plate 19 by placing an adhesive strip or glue on the back of the base portion 16. Naturally, when using the holding device 11 of the second embodiment of FIG. 2, the switch plate 19 which was previously used may be retained, unlike the first embodiment device of FIG. 1. Additionally, a plug or pin 18 may extend from the base portion 16 which is broken-away in FIG. 2 through the existing holes in the plate 19 and grip the threads in the switch itself.

Similarly, the holding device 21 of the third embodiment of FIG. 3 makes use of the existing switch plate 19. Two brackets 26, 26' form the base portion of the holding device 21. The brackets 26, 26' are spaced apart a distance equal to the width of the switch plate 19. The device 21 is accordingly easily installed by sliding the brackets 26, 26' down over the plate 19. Channels 24 may additionally be cut into the inner edges of the brackets 26, 26' facing each other. Such channels 24 provide an especially tight fit and are particularly useful with wider plates 19.

The FIG. 4 embodiment shows a holding device 31 which is an underlayment type. The holding device 31 is dimensioned so that its base portion 36 matches the shape of three sides of the conventional switch plate 19. The device 31 is installed by removing or loosening the plate 19 and slipping it between the plate 19 and the wall. The screws 33 pass directly through corresponding holes or slots in the holding device 31. It is contemplated to add one, two or three additional flanges 34 to either or both sides and/or the bottom of the device. A double top and bottom holding device is illustrated in FIG. 5 which shows a holding device 41 with flanges 44 and 44'.

It is further to be understood that any of the devices shown in FIGS. 1-4 can be rotated through 180° during installation if desired, to hold papers at the bottom of a plate 19, rather than at the top thereof. Additionally, the devices of FIGS. 1-5 can be dimensioned so that they are rotated through 90° from those shown and papers can be held at the sides of a plate 19. Furthermore, if a combination of side and top or bottom flanges are provided, the entire device may be circular or rectangular so that paper can be held over a wider area. In any of these alternate embodiments, the base portion is the portion closest to the electrical installation.

There are claimed:

1. Holding device for attachment to electrical installations installed in walls, comprising a base portion, means for attaching said base portion to the electrical installation, and a planar flange portion integral with and extending outwardly from said base portion substantially parallel to and along the surface of the wall forming a double-walled pocket for holding articles between said flange and the surface of the wall in which said electrical installation is installed.

2. Holding device according to claim 1, wherein said base portion and said flange are formed of a one-piece unit.

3. Holding device according to claim 1, wherein said base and flange portions together form a T-shaped unit with said base portion being narrower than said flange portion.

4. Holding device according to claim 1, wherein said base portion is in the form of two brackets each having an inner edge facing each other, said inner edges being mutually spaced apart by a distance equal to an outside dimension of a conventional electrical plate, and being slideable thereover, said attaching means being said inner edges of said brackets.

5. Holding device according to claim 4, wherein said inner edges of said brackets have grooves formed along the length thereof, the outer edges of the plate being partially insertable in said grooves.

6. Holding device according to claim 1, wherein said base portion is insertable between a conventional electrical plate and the electrical installation.

7. Holding device according to claim 6, including a doubly-bent portion between said base and said flange portions corresponding in depth substantially to the thickness of a conventional electrical plate.

8. Holding device according to claim 1, including at least one additional flange portion integral with and extending outwardly from said base portion in a different direction than said first-mentioned flange portion.

9. Holding device according to claim 1, wherein said base portion has a length and width substantially equal to a conventional electrical plate.

10. Holding device according to claim 1, wherein said attaching means is glue.

11. Holding device according to claim 1, wherein said attaching means is an adhesive strip.

12. Holding device according to claim 1, wherein said attaching means includes holes formed in said base portion in alignment with threaded holes formed in a conventional electrical plate.

13. Holding device according to claim 1, wherein said flange portion is prestressed against the surface of the wall.

14. Holding device according to claim 13, wherein said flange portion is bent toward the surface of the wall.

* * * * *